(12) United States Patent
Zhou et al.

(10) Patent No.: US 11,277,553 B2
(45) Date of Patent: *Mar. 15, 2022

(54) SWITCHOVER CONTROL TECHNIQUES FOR DUAL-SENSOR CAMERA SYSTEM

(71) Applicant: Apple Inc., Cupertino, CA (US)

(72) Inventors: Jianping Zhou, Fremont, CA (US); Sebastien Beysserie, Milpitas, CA (US); Jozef Kruger, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,434

(22) Filed: Jun. 3, 2020

(65) Prior Publication Data

US 2020/0296270 A1  Sep. 17, 2020

Related U.S. Application Data

(63) Continuation of application No. 15/617,918, filed on Jun. 8, 2017, now Pat. No. 10,701,256.

(60) Provisional application No. 62/349,020, filed on Jun. 12, 2016.

(51) Int. Cl.
*H04N 5/225* (2006.01)
*H04N 5/232* (2006.01)
*H04N 5/247* (2006.01)

(52) U.S. Cl.
CPC ........... *H04N 5/2258* (2013.01); *H04N 5/232* (2013.01); *H04N 5/23212* (2013.01); *H04N 5/23296* (2013.01); *H04N 5/232127* (2018.08); *H04N 5/247* (2013.01)

(58) Field of Classification Search
CPC ............. H04N 5/2258; H04N 5/23212; H04N 5/23296; H04N 5/232; H04N 5/247; H04N 5/232127; H04N 5/23238
See application file for complete search history.

(56) References Cited

U.S. PATENT DOCUMENTS 9,742,971 B2   8/2017  Richards et al.
9,781,345 B1  10/2017  Miller et al.
10,230,898 B2  3/2019  Cohen et al.
(Continued)

FOREIGN PATENT DOCUMENTS

WO   WO 2018/035945 A1   3/2018

OTHER PUBLICATIONS

"Evening the odds LG G5 review"; http://www.gsmarena.com/lg_g5-review-1416.php; GSMarena.com; 2000-2016; accessed Jun. 8, 2016; 4 pages.

*Primary Examiner* — Nelson D. Hernández Hernández
(74) *Attorney, Agent, or Firm* — BakerHostetler

(57) ABSTRACT

Techniques are described for automatically selecting between multiple image capture subsystems with overlapping fields of view but different optical properties. A selection may be made by estimating a plurality of operational characteristics of an image capture event, and, based on those estimates, selecting a primary image capture subsystem for the image capture event. For example, in a device such as a cellphone comprising two capture subsystems, each subsystem including a lens system and sensor system where each subsystem has a different fixed optical zoom parameter, a subsystem can be chosen based on a combination of desired zoom value, estimated focus distance, and estimated scene brightness.

23 Claims, 7 Drawing Sheets

(56) References Cited

U.S. PATENT DOCUMENTS

| | | | |
|---|---|---|---|
| 10,356,332 B2 | 7/2019 | Cohen et al. | |
| 10,701,256 B2 * | 6/2020 | Zhou | H04N 5/23238 |
| 2003/0020814 A1 * | 1/2003 | Ono | H04N 5/232 |
| | | | 348/220.1 |
| 2006/0275025 A1 | 12/2006 | Labaziewicz et al. | |
| 2008/0219654 A1 * | 9/2008 | Border | H04N 5/2258 |
| | | | 396/89 |
| 2012/0242809 A1 | 9/2012 | White et al. | |
| 2015/0103222 A1 | 4/2015 | Choi et al. | |
| 2016/0295097 A1 | 10/2016 | Shanmugavadivelu et al. | |
| 2016/0316147 A1 | 10/2016 | Bernstein et al. | |
| 2017/0099435 A1 | 4/2017 | Chen et al. | |
| 2017/0134640 A1 | 5/2017 | Wang et al. | |
| 2018/0184010 A1 * | 6/2018 | Cohen | H04N 5/23296 |

\* cited by examiner

100

600

700

SWITCHOVER CONTROL TECHNIQUES FOR DUAL-SENSOR CAMERA SYSTEM

CROSS-REFERENCE TO RELATED APPLICATIONS

This application is a continuation of U.S. application Ser. No. 15/617,918, filed Jun. 8, 2017, now allowed, which claims benefit under 35 U.S.C. § 119(e) of U.S. Provisional Application Ser. No. 62/349,020, filed Jun. 12, 2016, which is incorporated herein by reference in its entirety.

BACKGROUND

The present disclosure is directed to control systems for multi-camera electronic devices.

There are a wide variety of camera designs that find application in modern consumer electronic devices. For example, compact cameras and single-lens reflex cameras tend to be fairly complex camera systems that provide control over a relatively wide range of operational parameters, such as focus distance, zoom, exposure time, iris control, shutter speed and the like. Other camera systems, particularly those that integrate a camera system into a multifunction consumer electronics device such as a smartphone, tablet computer or notebook computer, tend to be much simpler. They may provide a degree of control, for example, over focus distance and/or exposure time but their designs may not permit variation of other parameters such as optical zoom or iris aperture. The level of complexity of an individual camera system often dictates a cost associated with that camera system.

Traditionally, multifunction consumer electronics devices employed either a single camera system or multiple camera systems looking in opposite directions to capture image data. The cameras of such devices were very simple, with limited focus capability and often no control over optical zoom or other operational parameters. Recently, some consumer devices have integrated multiple camera systems that have overlapping fields of view, each with different, fixed optical properties. For example, one camera system may have a relatively wide field of view and another camera system may have a narrower field of view. In such cameras, users must expressly select which of the camera systems is to be used for image capture. Such selections are cumbersome for users and introduces delay into image capture operations, which can cause image capture opportunities to be lost if an imaging subject changes.

The inventors propose techniques to remedy these disadvantages.

DETAILED DESCRIPTION

Embodiments of the disclosure provide techniques for automatically selecting between multiple image capture subsystems with overlapping fields of view but different optical properties. A selection may be made by estimating a plurality of operational characteristics of an image capture event, and, based on those estimates, selecting a primary image capture subsystem for the image capture event. For example, in a device such as a cellphone comprising two capture subsystems, each subsystem including a lens system and sensor system where each subsystem has a different fixed optical zoom parameter, a subsystem can be chosen based on a combination of desired zoom value, estimated focus distance, and estimated scene brightness. In the example, when the desired zoom value, estimated focus distance, and estimated scene brightness are all above thresholds, the subsystem with higher optical zoom parameter value may be chosen, while if any values are below its respective threshold, the subsystem with a wider field of view (e.g. lower zoom parameter value) may be chosen as the primary camera system.

Figure 1:
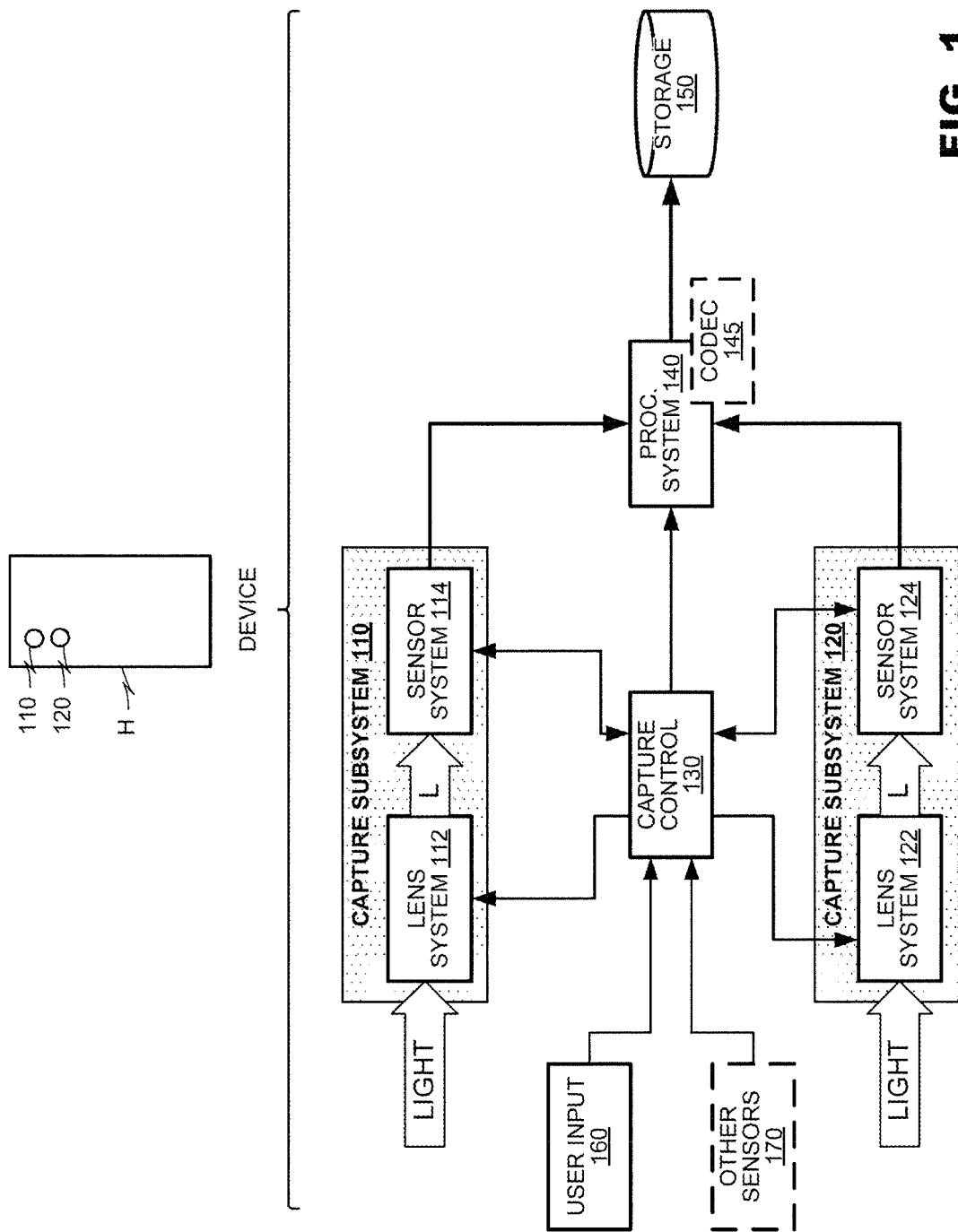
FIG. 1 is a block diagram of a device according to an embodiment of the present disclosure.

FIG. 1 is a block diagram of a device 100 according to an embodiment of the present disclosure. The device 100 may include a plurality of image capture subsystems 110, 120, a capture control system 130, an image processing system 140, a storage system 150, and a user input system 160. Each image capture subsystem 110, 120 may capture image data representing image information of a local environment. The image capture subsystems 110, 120 may have different optical characteristics owing to differences in lens systems 112, 122 and/or sensor systems 114, 124 therein. The capture control system 130 may estimate which of the image capture subsystems 110, 120 should be utilized as a primary camera to capture image data during a capture event. Typically, the capture control system 130 will alter operational parameters of the image capture subsystems based on the subsystems' status as a primary camera or, alternatively, a secondary camera. The processing system 140 may apply processing operations to the captured image data, which may be stored in the storage system 150. Operators of the device 100 may initiate a capture event by entering commands to the device 100 via the user input system 160.

As indicated, each image capture subsystem 110, 120 may have a lens systems 112, 122 and sensor system 114, 124. The lens systems 112, 122 may include respective lenses that are driven by actuators (not shown) for focus control; such actuators may be voice coil actuators, microelectro-mechanical (commonly, "MEMS") actuators or the like. The lens systems 112, 122 optionally may include other camera elements such as an iris (also not shown), which may control an amount of light that is incident on the sensor system 114, 124.

The capture subsystems 110 and 120 may be oriented substantially in the same direction and may have overlapping fields of view. For example, capture systems 110 and 120 both may be mounted on a housing H of the capture device 100 in proximity to each other. Center axes of the lens systems 112 and 122 may be aligned to each other, for example, as parallel or very close to parallel to each other, such that the capture subsystems 110 and 120 would image data of a common scene if they were enabled simultaneously.

In some embodiments, the capture control system 130 may control operation of the lens systems 112, 114 by, for example, changing the focus distance of the lens systems 112, 114. If the lens system is so capable, the capture control system 130 also may control zoom, magnification or field of view of the lens systems 112, 114, and/or control an aperture diameter of light passed by an iris of the lens systems 112, 114. It is unnecessary, however, that all of these parameters of the lens systems 112, 114 be controlled by the capture control system 130. And, of course, owing to the differences among the lens system 112 and the other lens system 114, the capture control system 130 may be able to control some operational parameters in one of the lens systems (say, system 112) while those same operational parameters would be fixed in the other lens system (say, system 122). Sensor system 114 may convert the light received by the sensor of sensor system 114 into a digital image comprising pixel data for a two dimensional raster array of pixels. Control system 130 may control various aspects of the digitization process, such as controlling the sensitivity or gain of the sensor system 114.

Each sensor system 114, 124 may include a solid-state image sensor, for example a focal plane array, a charge coupled device (commonly, "CCD") or a CMOS image sensor. The image sensors 114, 124 each may have a plurality of pixel circuits defined therein that convert incident light into an electrical signal representing intensity of the incident light. Oftentimes, individual pixel circuits are coupled to optical filters that permit the pixel to detect a single component of incident light, for example, red, blue or green light. The sensor system 114, 124 may include interpolators that generate multi-component image data at each pixel location.

The image capture subsystems 110, 120 may have different characteristics from each other. For example, both subsystems 110, 120 may have a fixed optical zoom, but camera subsystem 110 may have a higher zoom level (and smaller field of view) than the camera subsystem 120. Alternatively, both subsystems 110, 120 may have variable zoom, with camera subsystem 110 having a higher maximum zoom than subsystem 120 and camera subsystem 120 having a lower minimum zoom than subsystem 110. The camera subsystems may also differ based on other characteristics, such as the quality of lenses in the lens systems, or the amount of power used by the different capture subsystems. The capture control system 130 may determine settings of the sensor systems 114, 124 to define frame resolution and frame rates. For example, one of the capture subsystems outputs higher frame resolution and higher frame rate, while others output lower resolution and rate to reduce memory and power consumption. When the functional range of a parameter value differs between the camera systems, the functional ranges may but need not overlap each other.

The capture control system 130, as its name implies, may control operation of the image capture subsystems 110, 120 during capture events. The capture control system 130 may alter operational parameters of the image capture subsystems 110, 120 during capture events, based on their status as primary cameras or secondary cameras. The capture control system 130 may determine settings of the lens systems 112, 122 to define the focus distance, zoom, magnification or field of view and/or iris aperture diameter parameters discussed above. The capture control system 130, therefore, may perform auto-focus operations by estimating degree of blur in output of the subsystems' image sensors 114, 124 and correcting focus distance of the subsystems' lens systems 112, 122. The capture control system 130 may determine settings of the sensor systems 114, 124 to define frame resolution and frame rates. The capture control system 130 also may perform auto-exposure control to regulate brightness of image content output by the sensor systems 114, 124 as needed under changing brightness conditions.

As discussed, operational parameters of the image capture subsystems 110, 120 may be altered based on their status either as a primary camera or a secondary camera. In one embodiment, when an image capture subsystem (say, subsystem 110) is selected as a primary camera, that image capture subsystem 110 may be enabled during the capture event and the other image capture subsystem 120 may be disabled. Disabling non-primary image capture subsystems 120 may conserve power in a device 100. Alternatively, multiple image capture subsystems 110, 120 may be enabled during an image capture event but operational parameters of the image capture subsystems 110, 120 may be tailored according to their designations, either as primary cameras or secondary cameras. For example, a primary camera may be operated at a higher frame rate or a higher resolution than a secondary camera.

The processing system 140 may be a processor or other device that forms an image file or video file as appropriate from output of the image data output by the image capture subsystems 110, 120. For example, for still images, the processing system 140 may form files according to, for example, one of the PNG (Portable Network Graphics), JPEG (Joint Photographic Experts Group), and/or EXIF (Exchangeable Image File Format) families of file formats. Similarly, for videos, the processing system 140 may form files according to, for example, the M4V, Windows Media Video or MPEG-4 families of file formats. The processing system 140 may include one of more codecs 145 to perform compression operations required by these file formats. Formation of such files may involve conversion of image data from native formats output by the image capture subsystems 110, 120 to a format that is appropriate for the selected file format. The capture control system 130 and the processing system 140 may enable partial operation for one of image capture subsystems, such as collecting auto-exposure/auto-focus/auto-white-balance statistics, while disabling other functionality, such as the image processing pipeline, to reduce memory and power consumption.

In an embodiment, the processing system 140 also may perform image and/or video composition operations to merge outputs from the image capture subsystems 110, 120 into a common representation. For example, the processing system 140 may perform image stitching to merge a high resolution image obtained from a primary camera with a relatively narrow field of view with a lower resolution image obtained from a secondary camera with a wider field of view. The processing system also may perform temporal interpolation to merge content from a primary camera operating at a relatively high frame rate but having a relatively narrow field of view with a secondary camera operating at a lower frame rate with a wider field of view. Thus, the processing system's output may represent a merger of outputs from the image capture subsystems 110, 120.

The storage system 150 may include one or more storage device to store the image and/or video files created by the device 100. The storage system 150 may include electrical, magnetic and or optical storage devices (not shown) to store these files.

The user input system 160 may include one or more user-actuated devices to govern capture events. For example, the user input system 160 may include a touch screen or mechanical button through which a user indicates that image capture is to commence or indicates when video capture is to commence and when it is to end. The user input system 160 also may include inputs, again perhaps a touch screen control or buttons, that govern other aspects of image capture such as capture mode (video vs. still image, panoramic images vs. square images, etc.), zoom control, flash control and the like.

During operation, the device 100 may capture digital still images or motion video images by one of the capture subsystems 110, 120 as determined by the capture control system 130. Typically, at least one of the capture subsystems (say, subsystem 110) will be enabled as an operator orients the device 100 for image capture. The capture subsystem 110 may receive light from the scene being imaged. Lens system 112 may direct received light to the sensor system 114, which may create image data therefrom. The image data from one image capture subsystem may be rendered on a display (not shown) of the device 100 to preview image data that will be captured by the device. In other embodiment, the image data from two image capture subsystems may be combined to provide improved experience. The operator may enter commands to the device via the input system 160 to compose the image to suit the operator's needs and, when the image is properly composed, to cause the device 100 to capture an image. The capture control system 130 may select which of the image capture subsystems 110, 120 to perform image capture.

Control system 130 may choose which image capture subsystem 110, 120 to use for a capture a particular image, and control system 130 may also control any capture parameters that can be varied over a functional range, such as zoom or focus on the chosen lens system. The selection of which capture subsystem is to be used may be overridden by input from user control 160 in which case the user control 160 may govern. In the absence of an express selection of which image capture subsystem 110, 120 is to be used, the capture controller 130 may select an image capture subsystem 110, 120 from a user's preferred image capture parameter values. For example, user control 160 may provide a desired zoom level or a desired field of view, may specify a desired focus distance, or may specify a desired scene brightness. For example, a user control may specify a part of or point in a scene for which to optimize an image capture operation, and the focus distance to portion of a scene or the brightness of that part of the scene can be estimated and optimized for. Alternatively, the capture controller 130 may select an image capture subsystem 110, 120 for a capture event based on input from other sensors 170 on the device 100, for example, a device orientation sensor.

The components illustrated in FIG. 1 represent components of an image capture system of the device 100. In practice, it is likely that a device will include other components (not illustrated) that are used for other purposes. For example, in FIG. 1, the device 100 is shown as a smartphone, which may include processing systems and communication systems to permit exchange of data, including the image data captured by the image capture system, with other devices via communication and/or computer networks such as cellular networks or short distance wireless networks (e.g., WiFi, Bluetooth, etc.). Such other components are not illustrated in FIG. 1, for convenience.

Figure 2:
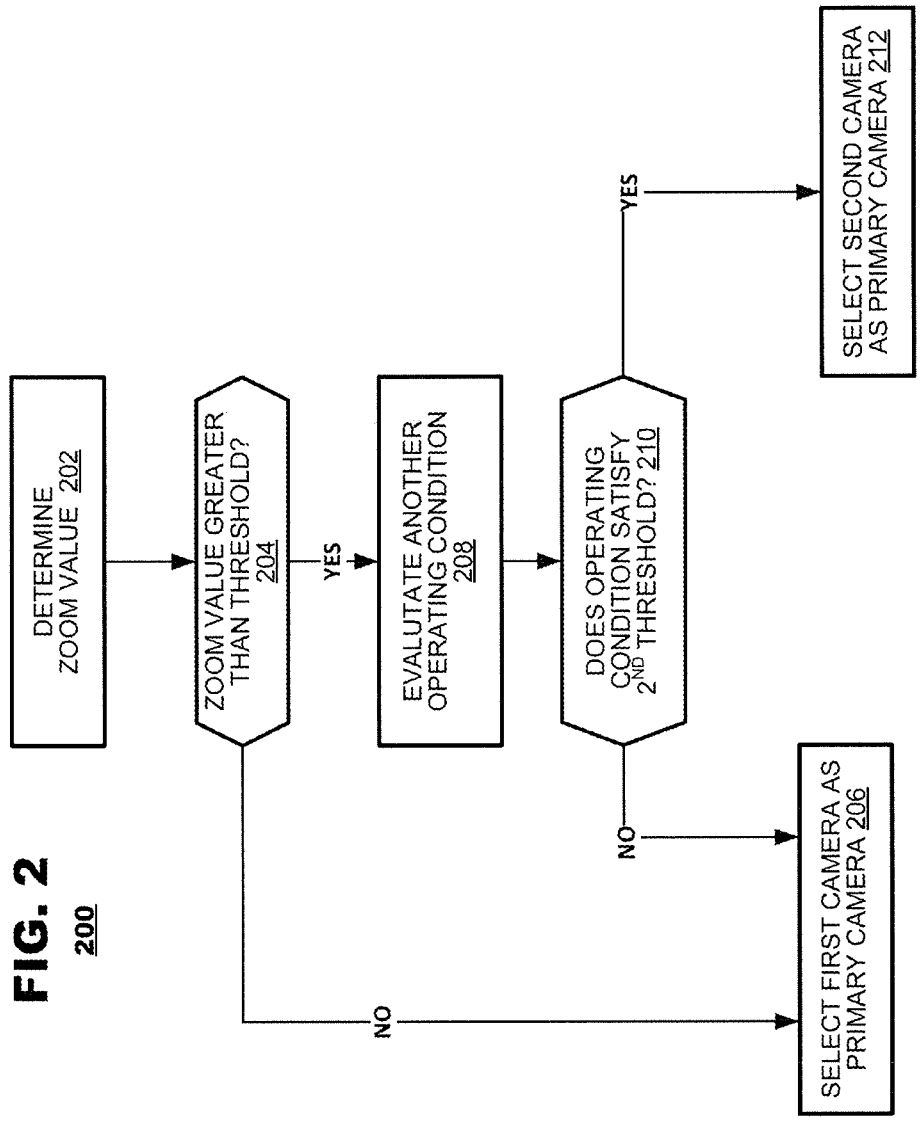
FIG. 2 illustrates a first method of selecting between candidate image capture subsystems according to an embodiment of the present disclosure.

FIG. 2 illustrates a first method 200 of selecting between candidate image capture subsystems according to an embodiment of the present disclosure. Method 200 considers zoom and at least one other operating condition to select a camera or capture subsystem. If the zoom value is greater than the threshold, then the method 200 may consider other image capture parameters, such as scene brightness or focus distance as its selects an image capture subsystem should be primary.

The method 200 may find application in a system where the first camera and the second camera differ based on operating parameters. For example, method 200 may be beneficial where the cameras differ based on their field of view, such as where the first camera system is a fixed zoom "wide field of view" camera and the second camera system is a fixed zoom "telephoto" camera. Under certain low light conditions, a digitally zoomed image captured by the wide field of view camera may be better quality an image having the same zoom value but captured by the telephoto camera. Also, a wide angle camera may be able to focus on certain distances that are outside of the focus range of the telephoto camera, and thus it may be desirable to select the wide camera as primary to achieve the desired focus, even if the image may require more digital zoom.

The method 200 may begin upon determination of a zoom value to be applied during image capture (box 202). The method 200 may compare the zoom value to a threshold (box 204). If the zoom value is less than the threshold, then the method 200 may select the wide field of view camera as the primary camera (box 206). If the zoom value is greater than the threshold (box 204), then the method 200 may evaluate an operating condition (or capture parameter) of a scene that would be captured (box 208). The operating condition may be tested against a threshold (box 210). If the threshold is not satisfied, the first camera may be selected as primary (box 206). If by contrast the respective threshold is satisfied, is the second camera may be selected as primary camera (box 212).

The principles of the present disclosure may be expanded to include several different operating conditions whose state may be estimated and compared to respective thresholds. The thresholds may distinguish operating conditions for which the first camera is preferred for use as the primary camera from operating conditions for which the second camera is preferred for use as the primary camera. The selection of operating conditions and their respective thresholds may be tailored to the designs of the camera subsystems that are at work in their devices after consideration of settings for which the various camera systems out-perform the other camera systems.

FIG. 2 illustrates a choice between two camera capture subsystems, namely the first camera and the second camera. The first camera may be, for example, a wide field of view (FOV) camera (low zoom value), and the second camera may be a telephoto camera (higher zoom value). However, method 200 may be used for selecting between any two cameras, for example where camera capture parameters vary by focus distance or light sensitivity instead of, or in addition to, differing optical zoom parameters.

A scene brightness may be one of the at least one operating conditions evaluated in box 208. The operations involving determination of zoom values (box 202) and estimation of scene brightness (box 208) may be performed by activating one of the image capture subsystems and using its output prior to image capture. For example, user zoom values and focus distance may be derived as users compose images using output from one of the image capture subsystems. Indeed, the method 200 may switch between the image capture subsystems dynamically as users alter such factors during image composition. For example, a user may enter a desired zoom value directly, such as by actuating buttons that govern zoom values, moving a slider in a graphical user interface or entering a pinch command via a touch screen devices. Alternately, a user could specify a numeric angle of a desired field of view. Similarly, focus distance may be set during user composition as users cause the camera to focus on a desired subject. Again, focus distance may be estimated based on an auto-focus actuator current or may be read from a Hall position sensor which measures lens placement directly.

FIG. 2 illustrates a variety of threshold values against which zoom values and other operating conditions are to be compared. During application, device designers may select threshold values that are tailored to the designs of the camera subsystems that are at work in their devices after consideration of settings for which the various camera systems out-perform the other camera systems. For example, the zoom value threshold (box 204) may be defined after consideration of optical capabilities of the lens systems 112, 122 that are used in their devices. Similarly, a brightness threshold (box 210) may be defined after consideration of noise sensitivities of sensor systems 114, 124 (FIG. 1) being used in their devices. Thus, these threshold values may be tailored to individual application needs.

In some applications, any of the thresholds may vary depending on one or more factors, such as the desired zoom value, or which camera is currently the primary camera. As an example, the system may also include some hysteresis, such as having a higher brightness threshold for switching from a wide field of view camera as primary to a telephoto camera as primary than when switching from a telephoto camera as primary to a wide field of view camera as primary. With a hysteresis such as this may prevent constant switching of the primary camera when the scene brightness is hovering around the scene brightness threshold.

Figure 3:
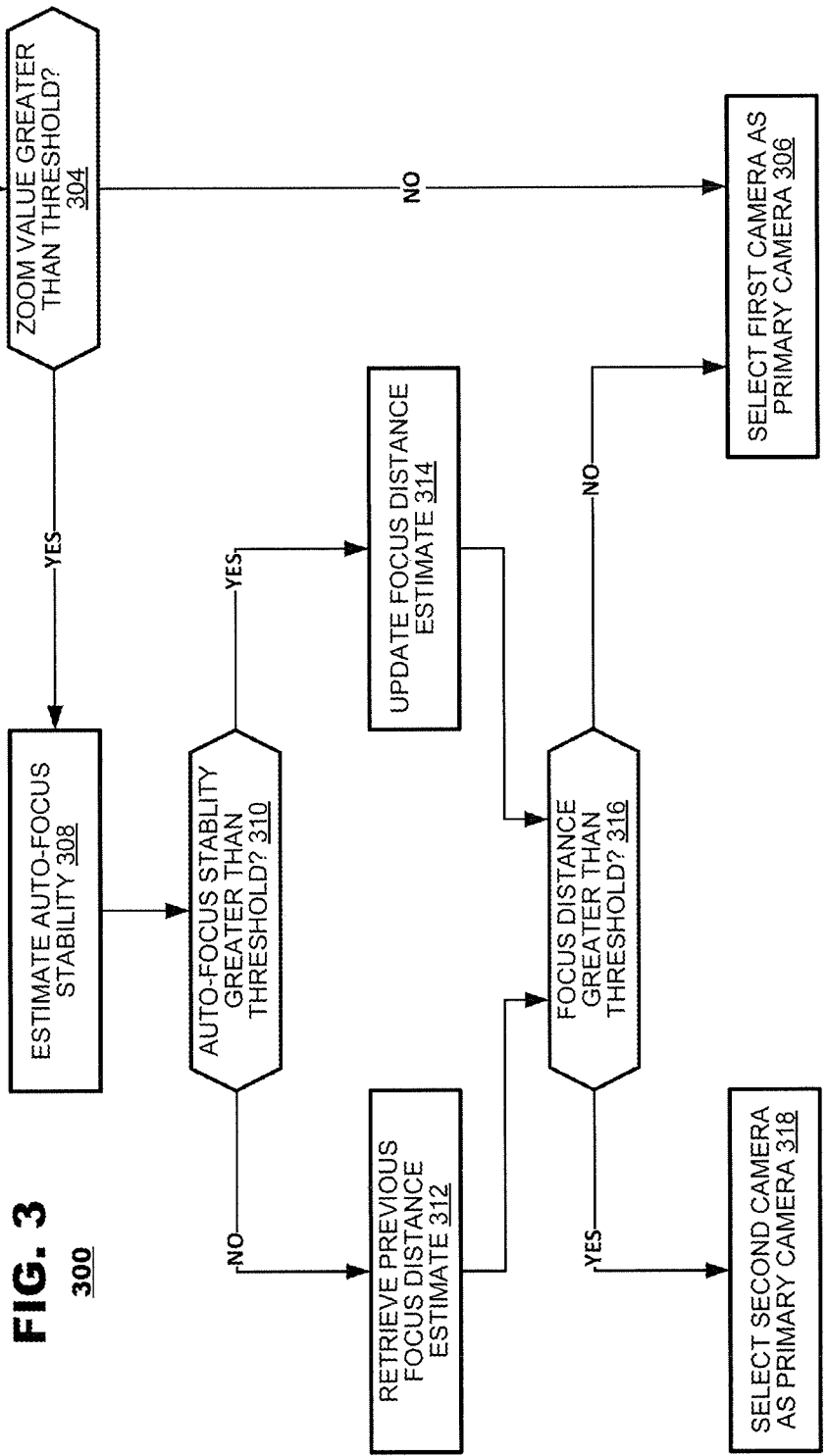
FIG. 3 illustrates a second method of selecting between candidate image capture subsystems according to an embodiment of the present disclosure.

FIG. 3 illustrates a second method of selecting between candidate image capture subsystems according to an embodiment of the present disclosure. Method 300 considers zoom and focus distance to select a camera or capture subsystem. If the zoom value is greater than the threshold, then the method 300 may consider the focus distance as its selects an image capture subsystem should be primary. Again, the method 300 may find application in a system where the first camera and the second camera differ based on operating parameters. For example, they may differ based on their field of view, where the first camera system is a "wide field of view" camera and the second camera system is a "telephoto" camera.

The method 300 may begin upon determination of a zoom value to be applied during image capture (box 302). The method 300 may compare the zoom value to a threshold (box 304). If the zoom value is less than the threshold, then the method may select a camera having wider field of view as a primary camera for image capture (box 306).

If the zoom value is greater than the threshold, then the method 300 may consider other image capture parameters such as focus distance as its selects an image capture subsystem to use. If the zoom value is greater than a threshold (box 304), the method 300 may estimate stability of auto-focus operations (box 308) and may compare an auto-focus stability value to a third threshold (box 310). If the auto-focus stability value does not exceed the third threshold, the method 300 may retrieve a previous focus distance estimate used by the device (box 312). Alternatively, if the auto-focus stability value exceeds the third threshold, the method 300 may generate an updated focus distance estimate (box 314). Thereafter, the method 300 may determine whether the focus distance is greater than a fourth threshold (box 316). If so, then image capture may occur using the image capture subsystem that has the telephoto camera (box 318). If not, then image capture may occur using the image capture subsystem that has the wide field of view (box 306).

FIG. 3 illustrates a variety of threshold values against which zoom values, auto-focus stability and focus distance are to be compared. During application, device designers may select threshold values that are tailored to the designs of the camera subsystems that are at work in their devices after consideration of settings for which the various camera systems out-perform the other camera systems. For example, the zoom value thresholds (box 304), auto-focus stability thresholds (box 310) and focus distance thresholds (box 316) may be defined after consideration of optical capabilities of the lens systems 112, 122 that are used in their devices. Thus, these threshold values may be tailored to individual application needs.

The operations involving determination of zoom values (box 302) and estimation of estimating focus distance (box 314) may be performed by activating one of the image capture subsystems and using its output prior to image capture. For example, user zoom values and focus distance may be derived as users compose images using output from one of the image capture subsystems. In some embodiments, the focus distance may be estimated based on an auto-focus actuator current or may be read from a Hall position sensor which measures lens placement directly. Indeed, the method 300 may switch between the image capture subsystems dynamically as users alter such factors during image composition. For example, a user may enter a desired zoom value directly, such as by actuating buttons that govern zoom values, moving a slider in a graphical user interface or entering a pinch command via a touch screen devices. Alternately a user could specify a numeric angle of a desired field of view. Similarly, focus distance may be set during user composition as users cause the camera to focus on a desired subject.

Zoom values may be estimated from optical zoom factors, digital zoom factors or a combination of both. Optical zoom factors may reflect operational state of a variable focal length lens system in an image capture system that is so equipped. Digital zoom factors may reflect state of processing operations to increase size of images captured by an image sensor beyond the optical capabilities of the image capture system. Digital zoom typically is accomplished by cropping an image in an area of interest and interpolating content within the cropped image to meet pixel dimensions of a desired image size; such digital zoom operations may be performed within an image capture subsystem 110, 120 (FIG. 1) or alternatively by a processing system 140.

In some embodiments, the method 300 may apply different zoom value thresholds (box 304) based on the amount of digital zoom and the amount of optical zoom that is active. For example, the threshold may be configured to select a first camera subsystem as a primary camera when a digital value as at a predetermined value, rather than to switch to a second camera with a longer focal length and for which a lower amount of digital zoom would be applied.

Figure 4:
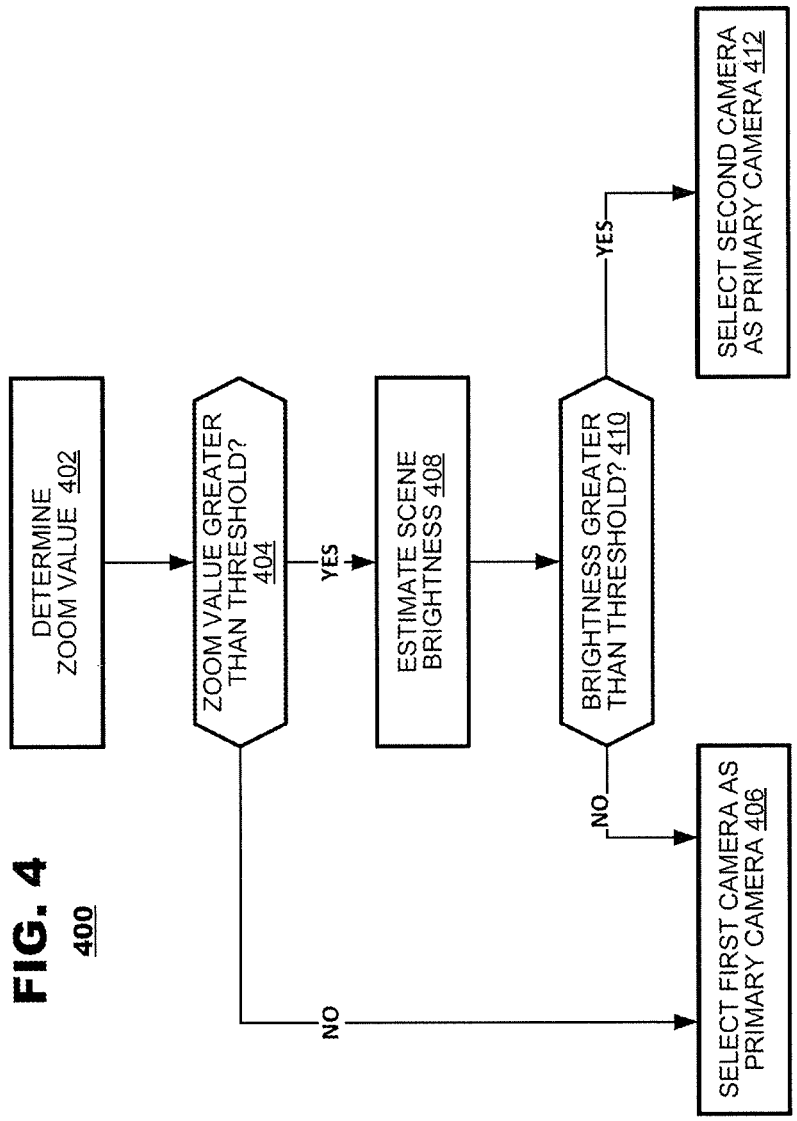
FIG. 4 illustrates a third method of selecting between candidate image capture subsystems according to an embodiment of the present disclosure.

FIG. 4 illustrates a third method of selecting between candidate image capture subsystems according to an embodiment of the present disclosure. Method 400 considers zoom and scene brightness to select a camera or capture subsystem. If the zoom value is greater than the threshold, then the method 400 may consider the scene brightness as its selects an image capture subsystem should be primary. Again, the method 400 may find application in a system where the first camera and the second camera differ based on operating parameters. For example, they may differ based on their field of view, where the first camera system is a "wide field of view" camera and the second camera system is a "telephoto" camera.

The method 400 may begin upon determination of a zoom value to be applied during image capture (box 402). The method 400 may compare the zoom value to a threshold (box 404). If the zoom value is less than the threshold, then the method 400 may select the wide field of view camera as the primary camera (box 406).

If the zoom value is greater than the threshold, then the method 400 may consider other image capture parameters such as scene brightness as its selects an image capture subsystem to use. If the zoom value is greater than the threshold (box 404), then the method 400 may estimate brightness of a scene that would be captured (box 408) and compare the brightness value to another threshold (box 410). If scene brightness is lower than the second threshold, then the method 400 may select the wide field of view camera as the primary camera (box 406). If scene brightness is greater than the second threshold, then the method 400 may select the telephoto camera as the primary camera (box 412).

The operations involving determination of zoom values (box 402) and estimation of scene brightness (box 408) may be performed by activating one of the image capture subsystems and using its output prior to image capture. For example, user zoom values and focus distance may be derived as users compose images using output from one of the image capture subsystems. Indeed, the method 400 may switch between the image capture subsystems dynamically as users alter such factors during image composition. For example, a user may enter a desired zoom value directly, such as by actuating buttons that govern zoom values, moving a slider in a graphical user interface or entering a pinch command via a touch screen devices. Alternately, a user could specify a numeric angle of a desired field of view. Similarly, focus distance may be set during user composition as users cause the camera to focus on a desired subject. Again, focus distance may be estimated based on an autofocus actuator current or may be read from a Hall position sensor which measures lens placement directly.

FIG. 4 illustrates a variety of threshold values against which zoom values and scene brightness are to be compared. During application, device designers may select threshold values that are tailored to the designs of the camera subsystems that are at work in their devices after consideration of settings for which the various camera systems out-perform the other camera systems. For example, the zoom value threshold (box 404) may be defined after consideration of optical capabilities of the lens systems 112, 122 that are used in their devices. Similarly, a brightness threshold (box 410) may be defined after consideration of noise sensitivities of sensor systems 114, 124 (FIG. 1) being used in their devices. Thus, these threshold values may be tailored to individual application needs.

Figure 5:
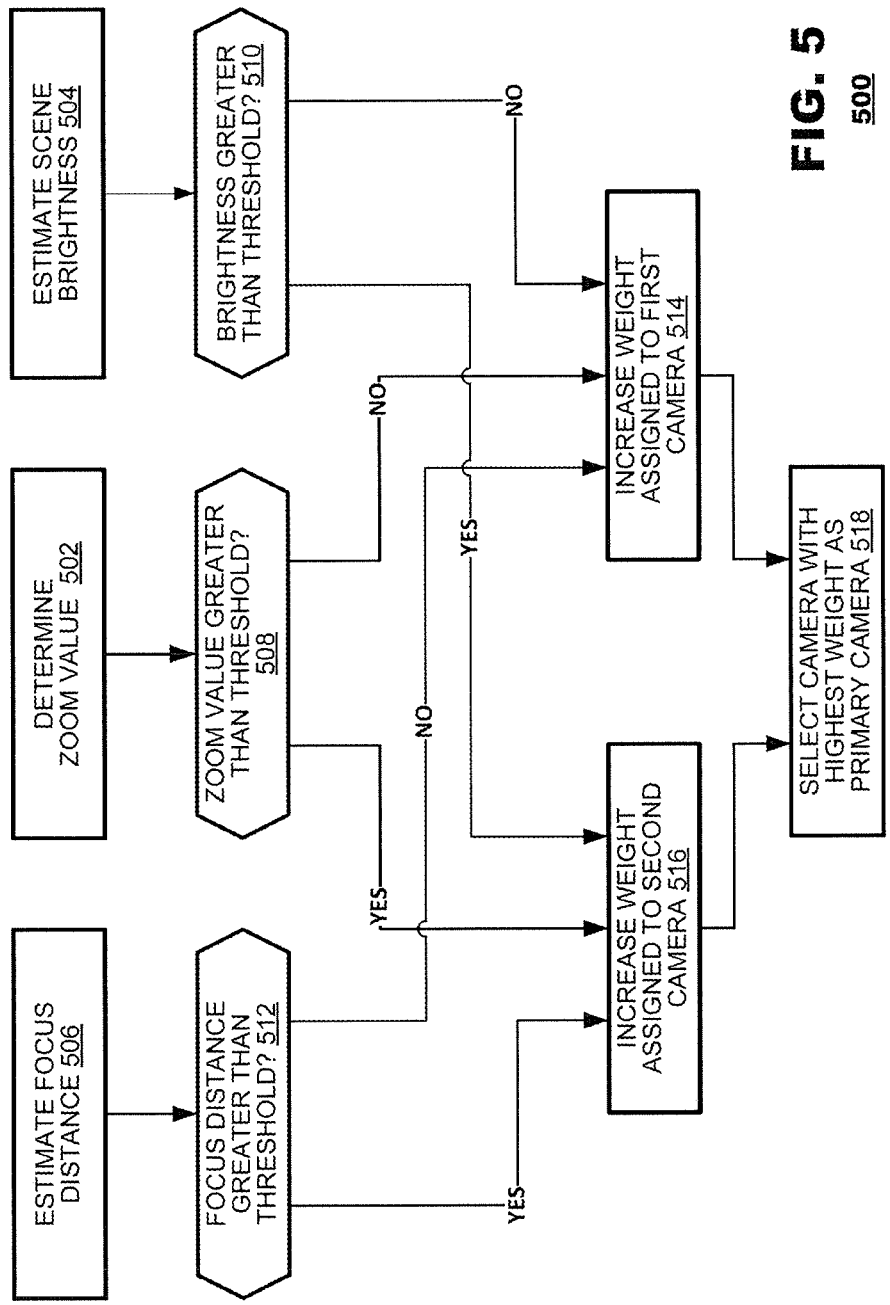
FIG. 5 illustrates a fourth method of selecting between candidate image capture subsystems according to an embodiment of the present disclosure.

FIG. 5 illustrates a fourth method 500 of selecting between candidate image capture subsystems according to an embodiment of the present disclosure. Method 500 considers zoom, scene brightness, and focus distance to select a camera or capture subsystem. If the zoom value is greater than the threshold, then the method 500 may consider the scene brightness as its selects an image capture subsystem. Again, the method 500 may find application in a system where the first camera and the second camera differ based on operating parameters. For example, they may differ based on their field of view, where the first camera system is a "wide field of view" camera and the second camera system is a "telephoto" camera.

The method 500 may make three determinations of operational parameters, involving zoom value (box 502), scene brightness (box 504) and focus distance (box 506), respectively. The method 500 may compare each of these estimated parameters to respective thresholds, shown in boxes 508, 510 and 512, respectively. Based on these comparisons, the method 500 may increase weight assignments to either the first camera (box 514) or the second camera (box 516). When weight adjustments have been made based on each of the three estimates, the method 500 may select the camera having the highest overall weight as the primary camera (box 518).

As illustrated in FIG. 5, when an estimated zoom value exceeds a corresponding threshold, the method 500 may increase a weight assigned to the second (perhaps telephoto) camera (box 516). In the contrary scenario, when the estimated zoom value does not exceed the threshold, the method 500 may increase a weight assigned to the first (perhaps wide field of view) camera (box 514).

Similarly, when an estimated scene brightness value exceeds a corresponding threshold, the method 500 may increase a weight assigned to the second (perhaps telephoto) camera (box 516). In the contrary scenario, when the estimated scene brightness value does not exceed the threshold, the method 500 may increase a weight assigned to the first (perhaps wide field of view) camera (box 514).

Moreover, when an estimated focus distance value exceeds a corresponding threshold, the method 500 may increase a weight assigned to the second (perhaps telephoto) camera (box 516). In the contrary scenario, when the estimated focus distance does not exceed the threshold, the method 500 may increase a weight assigned to the first (perhaps wide field of view) camera (box 514).

As with the other embodiments, FIG. 5 illustrates a variety of threshold values against which various operational parameters of the device are to be compared. Again, device designers may select threshold values that are tailored to the designs of the camera subsystems that are at work in their devices. For example, a brightness threshold (box 510) may be defined after consideration of noise sensitivities of sensor systems 114, 124 (FIG. 1) being used in their devices. Zoom value thresholds (box 508) and focus distance thresholds (box 512) may be defined after consideration of optical capabilities of the lens systems 112, 122 that are used in their devices. Thus, these threshold values may be tailored to individual application needs.

Figure 6:
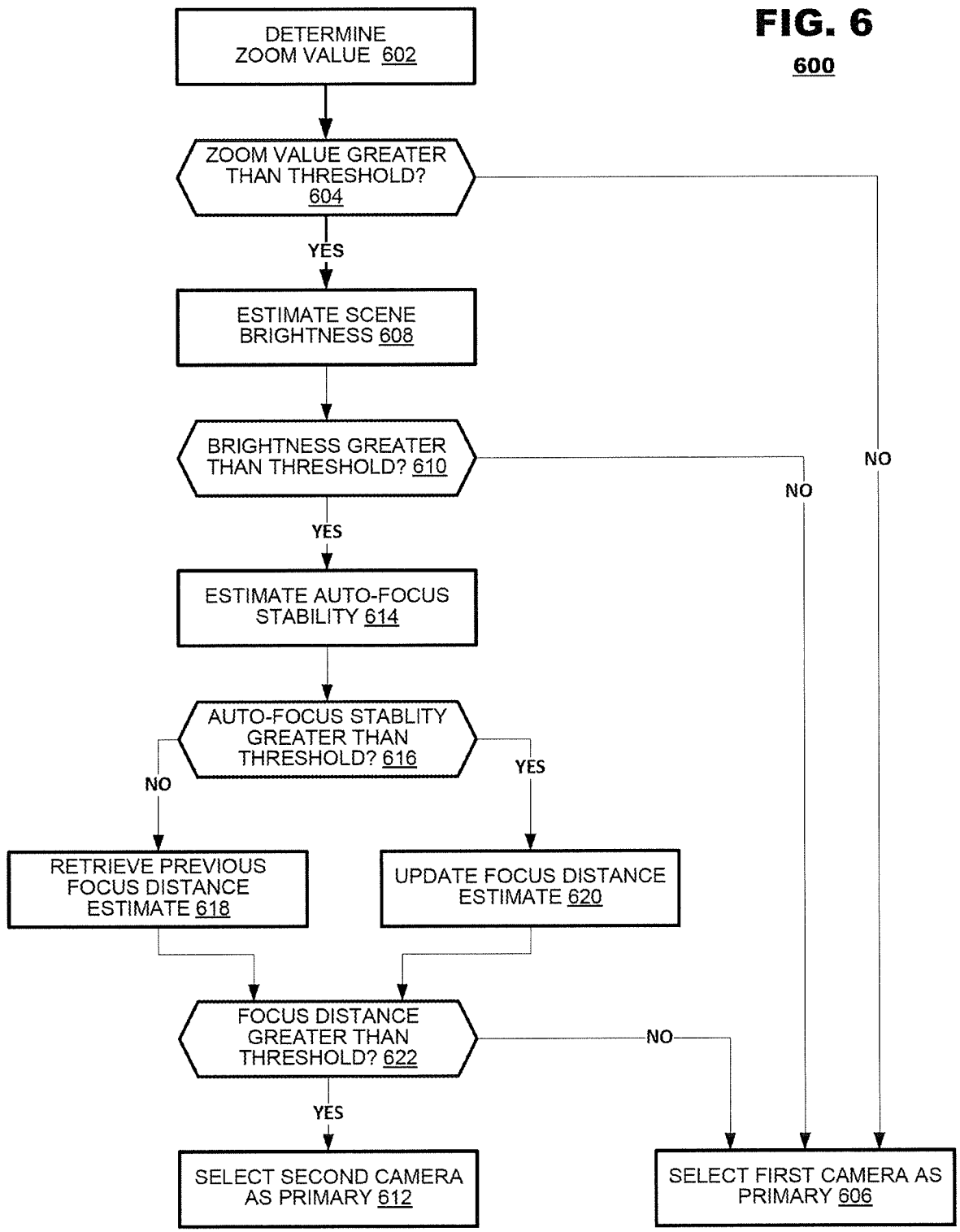
FIG. 6 illustrates a fifth method of selecting between candidate image capture subsystems according to an embodiment of the present disclosure.

FIG. 6 illustrates a fifth method of selecting between candidate image capture subsystems according to an embodiment of the present disclosure. Method 600 considers zoom, scene brightness, and focus distance to select a camera or capture subsystem. In method 600, all these capture conditions must be greater than a threshold to select the second camera, otherwise the first camera is selected. Because of this, the first camera of method 600 may be considered a default camera. Again, the method 600 may find application in a system where the first camera and the second camera differ based on operating parameters. For example, they may differ based on their field of view, where the first camera system is a "wide field of view" camera and the second camera system is a "telephoto" camera.

After determining a zoom value (box 602) if the zoom value is less than a first threshold (box 604), the first camera is selected as primary (box 606). However, if the zoom value is greater than the threshold (box 604), scene brightness may be estimated (box 608). If the estimated scene brightness is less than a second threshold (box 610) then the first camera is selected as primary (box 606), otherwise focus distance considered in boxes 614-622. Focus distance may be considered by first estimating the stability of an auto focus system (box 614). If the auto focus system is stable, that is if the estimate is greater than a third threshold (box 616), a current focus distance estimation is used (box 620), otherwise a previous focus distance estimate is retrieved for use (box 618). The focus distance estimates used here may be averaged or low-pass filtered estimates. The focus distance estimate determined in either box 618 or 620 is tested against a fourth threshold (box 622). If the focus distance estimate is greater than a threshold, the second camera may be selected as primary (box 612), otherwise, the first camera may be selected as primary (box 606).

Figure 7:
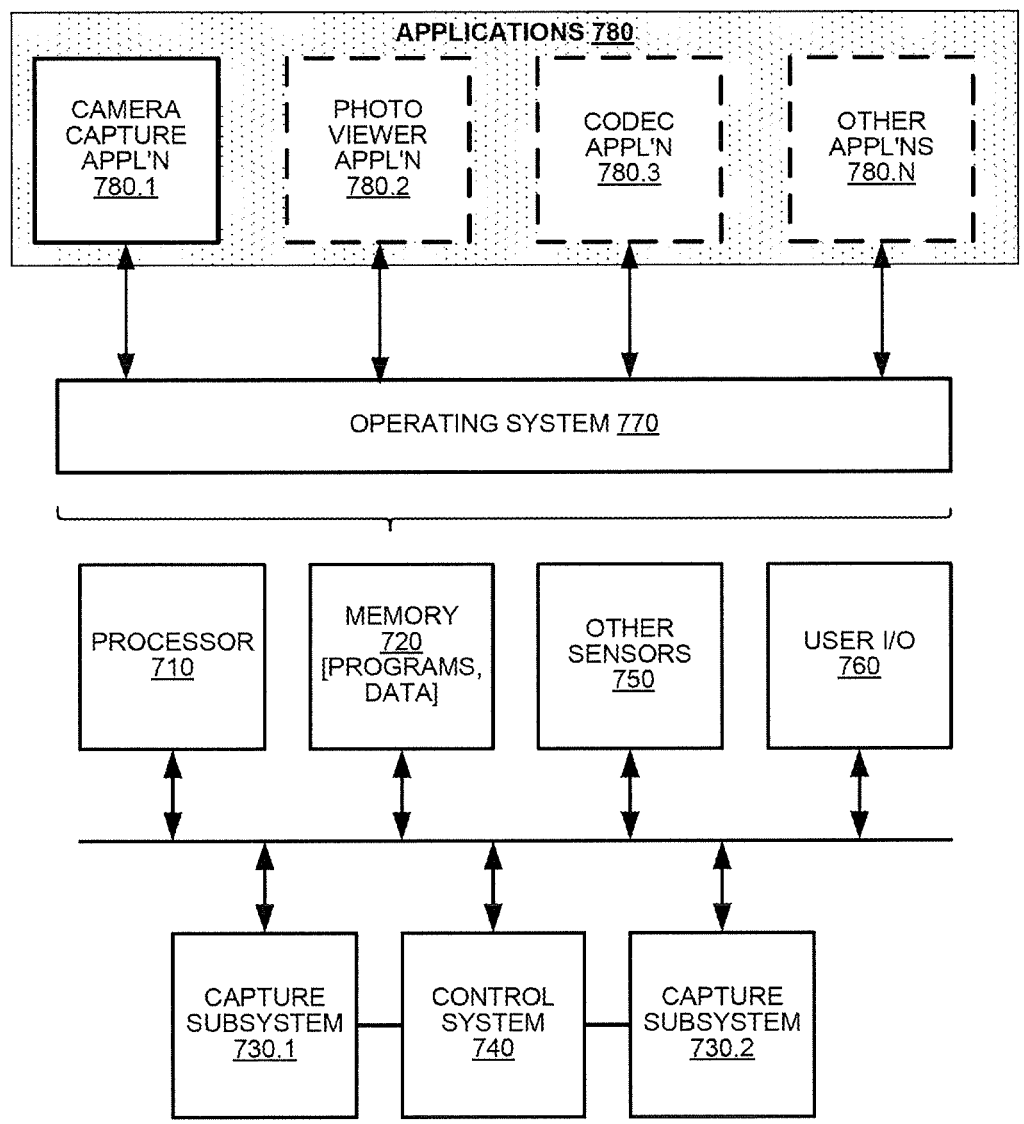
FIG. 7 is a system diagram of camera device according to an embodiment of the present disclosure.

FIG. 7 is a system diagram of camera device 700, according to an embodiment of the present disclosure. The camera device 700 may include a processor 710, memory 720 and a plurality of image capture subsystems 730.1, 730.2 all in communication with each other via a communication bus. The device 700 may include a control system 740 that controls some operational parameters of the image capture subsystems 730.1, 730.2. The device 700 also may include other sensors 750, and user input/output devices (I/O) 760 that communicate with the processor 710 and/or memory 730 by the communication bus.

The memory 720 may store instructions for execution by the processor 710 that define an operating system 770 and one or more applications 780 of the device 700. The applications 780 may include a camera capture application 780.1, a photo view application 780.2, and optionally codec application 780.3, among others. Applications 780 and operating system 770 be written in any programming language, such as, for example, C, Java, Objective-C, C+, Python, Visual Basic, Perl, or any other programming language capable of producing instructions that are capable of execution on the processor 710.

The camera capture application 780.1, the operating system 770 and the control system 740 may cooperate to control operation of the image capture subsystems 730.1, 730.2. For example, the camera capture application 780.1 may control timing of image capture events and parameters of image capture that are defined by user input. The control system 740 may perform auto-focus and/or auto-exposure control of the image capture subsystems 730.1, 730.2. With respect to selection between the image capture subsystems 730.1, 730.2, the principles of the present disclosure may place such controls within either the camera capture application 780.1 or the control system 740 as may be convenient.

The control system 740 may be implemented separately from processor 710 and may include dedicate hardware logic circuits. Control system 740 may further include its own local memory for storage of, for example the image capture parameters provided to it by the camera capture application.

The user I/O 760 components may include buttons or a touchscreen controller to accept user input. They may include display devices to render image data during image composition or when reviewing captured image data.

The processor 710 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute operating system 770 and applications 780 to facilitate capturing of images.

Memory 720 may be configured to store both programs and data. As indicated, the memory 720 may store instructions for the operating system 770 and applications 780 in machine readable form. The memory 720 also may store data associated with applications 780. For example, the memory 720 may store image data captured by the camera capture application 780.1, device information, user information, and the like. The memory 720 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a memory 720 or other machine readable medium, which may be incorporated into a computer program product.

Other sensors 750 may include, for example, a device orientation sensor that produces an estimate of the orientation of camera devices 700 relative to the direction of gravity. Other sensors 750 may provide the input from other sensors 170 of FIG. 1. User I/O 760 may include a touchscreen display, and may be capable displaying a captured image and may be capable of receiving input from a user indicating when to capture a picture. User I/O 760 may provide user control 160 input of FIG. 1. Capture subsystem 730.1 may be subsystem 110 of FIG. 1, while capture subsystem 730.2 may be subsystem 120.

The foregoing discussion has described operation of the foregoing embodiments in the context of a computer device such as a digital camera. Commonly, these cameras are provided as electronic devices such as personal computers, notebook computers, mobile computing platforms such as smartphones and tablet computers, dedicated gaming systems, portable media players, computer servers, and the like. As described, they may execute programs that are stored in memory of those devices and be executed by processors within them. Alternatively, they can be embodied in dedicated hardware components such as application specific integrated circuits, field programmable gate arrays and/or digital signal processors. And, of course, these components may be provided as hybrid systems that distribute functionality across dedicated hardware components and programmed general purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method of selecting between a plurality of image capture subsystems during an image capture event, the image capture subsystems having different characteristics and overlapping fields of view comprising:
   comparing a focus distance value of a lens system to a first threshold;
   evaluating at least one other operating condition;

comparing the at least one other operating condition to respective additional thresholds;
selecting one of the plurality of image capture subsystems as a primary camera based on the comparison to the first threshold and the comparison to the respective additional thresholds.

2. The method of claim 1, wherein one of the first operating condition and the at least one other operating condition includes a scene brightness value of the image capture event.

3. The method of claim 1, wherein one of the first operating condition and the at least one other operating condition includes a zoom value of the image capture event.

4. The method of claim 1, wherein one of the first operating condition and the at least one other operating condition includes a focus distance value of the image capture event.

5. The method of claim 1, wherein the first operating condition and the at least one other operating condition include at least a scene brightness value and a focus distance value of the image capture event.

6. The method of claim 1, wherein the plurality of image capture subsystems includes a first subsystem having a first field of view and a second subsystem having a second field of view, wider than the first field of view.

7. The method of claim 1, further comprising enabling the image capture subsystem selected as the primary camera for the image capture event and disabling another image capture subsystem.

8. The method of claim 1, further comprising operating the image capture subsystem selected as the primary camera during the image capture event at a higher frame rate than another image capture subsystem.

9. The method of claim 1, wherein the evaluating comprises:
enabling a selected image capture subsystem during the evaluating, evaluating the at least one operating condition from output of the selected image capture subsystem.

10. The method of claim 9, wherein a different image capture subsystem is enabled during the evaluating than during the image capture event.

11. The method of claim 9, wherein a same image capture subsystem is enabled during the evaluating and during the image capture event.

12. The method of claim 1 wherein the focus distance value of the lens system is specified by a user control.

13. The method of claim 1, wherein the focus distance value of the lens system is estimated based on Hall sensor measurement of the lens system.

14. The method of claim 1, wherein the focus distance value of the lens system is estimated based on auto-focus actuator current of the lens system.

15. An electronic device, comprising:
a first image capture subsystem having a first image sensor, a second image capture subsystem having a second image sensor, wherein the first and second image capture subsystem have different characteristics, a controller, responsive to a plurality of estimated operational characteristics of an image capture event including an auto-focus stability, to select either the first image capture subsystem or the second image capture subsystem as a primary camera for the image capture event based a comparison of the estimated operational characteristics including the auto-focus stability to respective thresholds.

16. The electronic device of claim 15, wherein the estimated operational characteristics include at least a zoom value and a scene brightness value.

17. The electronic device of claim 15, wherein the estimated operational characteristics include at least a zoom value and a focus distance value.

18. The electronic device of claim 15, wherein the estimated operational characteristics include at least a scene brightness value and a focus distance value.

19. The electronic device of claim 15, further comprising a user input system to accept input defining the onset of the image capture event.

20. The electronic device of claim 15, further comprising a storage system to store a file with content of the image capture event.

21. A non-transitory computer readable medium storing program instructions that, when executed by a processing device, cause the processing device to select between a plurality of image capture subsystems having different characteristics and overlapping fields of view for use during an image capture event, by:
comparing an auto-focus stability condition to a first threshold;
evaluating at least one other operating condition;
comparing the at least one other operating condition to respective additional thresholds;
selecting one of the plurality of image capture subsystems as a primary camera based on the comparison to the first threshold and the comparison to the respective additional thresholds.

22. A method of selecting between a plurality of image capture subsystems during an image capture event, the image capture subsystems having different characteristics and overlapping fields of view comprising:
comparing an auto focus stability condition to a first threshold;
evaluating at least one other operating condition;
comparing the at least one other operating condition to respective additional thresholds;
selecting one of the plurality of image capture subsystems as a primary camera based on the comparison to the first threshold and the comparison to the respective additional thresholds.

23. A method of selecting between a plurality of image capture subsystems during an image capture event, the image capture subsystems having different characteristics and overlapping fields of view comprising:
estimating a brightness value of a scene;
comparing the brightness value to a first threshold;
evaluating at least one other operating condition;
comparing the at least one other operating condition to respective additional thresholds;
selecting one of the plurality of image capture subsystems as a primary camera based on the comparison to the first threshold and the comparison to the respective additional thresholds.

* * * * *